United States Patent
Mitzkus et al.

(10) Patent No.: US 7,038,847 B2
(45) Date of Patent: May 2, 2006

(54) FLUORESCENCE MICROSCOPE

(75) Inventors: Reiner Mitzkus, Goettingen (DE); Alex Soell, Waake (DE)

(73) Assignee: Carl Zeiss Jena GmbH, Jena (DE)

( * ) Notice: Subject to any disclaimer, the term of this patent is extended or adjusted under 35 U.S.C. 154(b) by 293 days.

(21) Appl. No.: 10/049,548

(22) PCT Filed: Jun. 22, 2001

(86) PCT No.: PCT/EP01/07104

§ 371 (c)(1),
(2), (4) Date: Jun. 10, 2002

(87) PCT Pub. No.: WO02/01272

PCT Pub. Date: Jan. 3, 2002

(65) Prior Publication Data

US 2002/0196537 A1    Dec. 26, 2002

(30) Foreign Application Priority Data

Jun. 26, 2000   (DE)   .................. 100 30 929

(51) Int. Cl.
*G02B 21/06* (2006.01)
*G02B 21/00* (2006.01)
(52) U.S. Cl. ...................... 359/368; 359/385
(58) Field of Classification Search ........ 359/368–390, 359/885–892, 588–590, 637, 285; 250/226–245
See application file for complete search history.

(56) References Cited

U.S. PATENT DOCUMENTS 4,174,885 A * 11/1979 Joseph et al. ................. 359/15
4,943,142 A *  7/1990 Fay et al. ................... 359/889
5,233,197 A *  8/1993 Bowman et al. ......... 250/461.1
5,649,897 A *  7/1997 Nakamura et al. .......... 600/111
5,880,473 A    3/1999 Ginestet .................. 250/458.1
6,157,025 A * 12/2000 Katagiri et al. ............. 250/226
6,219,180 B1 * 4/2001 Hasegawa et al. .......... 359/387
6,262,837 B1 * 7/2001 Nagano et al. ............. 359/368
6,545,265 B1 * 4/2003 Czarnetzki et al. ......... 250/234

FOREIGN PATENT DOCUMENTS

DE    35 46 580    11/1990

OTHER PUBLICATIONS

Olympus Microscopy Resource Center: Specialized Microscopy Techniques—Fluorescence Microscopy, pp. 1-20.*
LIS > Administrative Code > 12 VAC 5 -480-8500. Therapeutic X-ray systems of less than one MeV, pp. 1-6.*

* cited by examiner

*Primary Examiner*—Thong Q Nguyen
(74) *Attorney, Agent, or Firm*—Reed Smith LLP

(57) ABSTRACT

Fluorescence microscope with blocking filters for a portion of the light emitted by a specimen have markings referring to the orientation of their wedge angle. A marking to which the marking on the filter can be oriented in a defined manner is preferably provided on the filter holder of the microscope, the filters being marked with respect to their wedge angle.

2 Claims, 3 Drawing Sheets

FLUORESCENCE MICROSCOPE

CROSS-REFERENCE TO RELATED APPLICATIONS

This application claims priority of PCT Application Ser. No. PCT/EP01/07104 filed Jun. 22, 2001 and German Application No. 100 30 929.1 filed Jun. 26, 2000, the complete disclosures of which are hereby incorporated by reference.

BACKGROUND OF THE INVENTION a) Field of the Invention

The present invention relates to microscopes equipped for handling fluorescence applications.

b) Description of the Related Art

A known microscope for fluorescence applications is shown in FIG. 1. The beam path in a microscope equipped for fluorescence applications is shown in that figure.

The light from an additional light source (1) passes through a head-absorbing filter (2), red attenuating filter/stop slide (3) and a field diaphragm (4) to the excitation filter (5). The latter is installed in the reflector slide of the microscope which also contains a dichroic beam splitter (6). The dichroic beam splitter reflects the shortwave excitation light through the objective (7) into the specimen or preparation (8).

The occurring emission is collected by the objective (7) and—because it has greater wavelengths than the excitation light is—passed by the dichroic beam splitter (6). The beams now pass through the emission filter (9). The remainder of the excitation light is filtered out by the latter. For this reason, this filter is also referred to as a blocking filter. As is conventional, the tube lens (10) and eyepiece (11) form the microscope image formed of fluorescent light.

The Problem Addressed by the Invention

In order to avoid image offset (pixel shift), multiple exposures in fluorescence recordings with different emission filter sets (A, B) require an optimal congruence of the object image in the individual recordings. However, there are technological limits in this respect.

Because of the different wedge angles of the emission filters ($A_{EM}$, $B_{EM}$) and of the color splitters, the filter combinations needed for the fluorescence application cause a slight image offset. This is shown in FIG. 2.

The reference symbols have the following meanings:

$A_{Em}$ emission filter of filter set A
$B_{Em}$ emission filter of filter set B
$a_1$ light beam striking $A_{Em}$
$b_1$ light beam striking $B_{Em}$
$a_2$ light beam deflected by $A_{Em}$
$b_2$ light beam deflected by $B_{Em}$
$\alpha_A$ angle between the incident light beam $a_1$ and the deflected light beam $a_c$ of filter $A_{EM}$
$\alpha_B$ angle between the incident light beam $b_1$ and the deflected light beam $b_2$ of filter $B_{EM}$
E image plane
$\overline{P_A P_B}$ distance (pixel shift) between the image points impinging on the image plane E The light beams $a_1$ and $b_1$ impinge on the emission filters $A_{Em}$ and $B_{Em}$ of the corresponding filter sets A and B. The beam is deflected in more or less opposite directions because of the existing wedge angle of the filters depending on the installed position ($a_2$ and $b_2$ are greatly exaggerated in the drawing in order to illustrate the process). Therefore, the image points impinging on the image plane E do not lie exactly one above the other, but are offset relative to one another by the pixel shift. Even with the close tolerances of the filters sets by Carl Zeiss with a slight image offset, this offset still occurs to a slight extent.

OBJECT AND SUMMARY OF THE INVENTION

The object of the invention is to overcome the slight image offsets caused by different wedge angles of emission filters and color splitters in a fluorescence microscope.

In accordance with the invention, a fluorescence microscope with blocking filters for a portion of the light emitted by a specimen are marked with respect to the orientation of their wedge angle.

DESCRIPTION OF THE PREFERRED EMBODIMENTS

Figure 3:
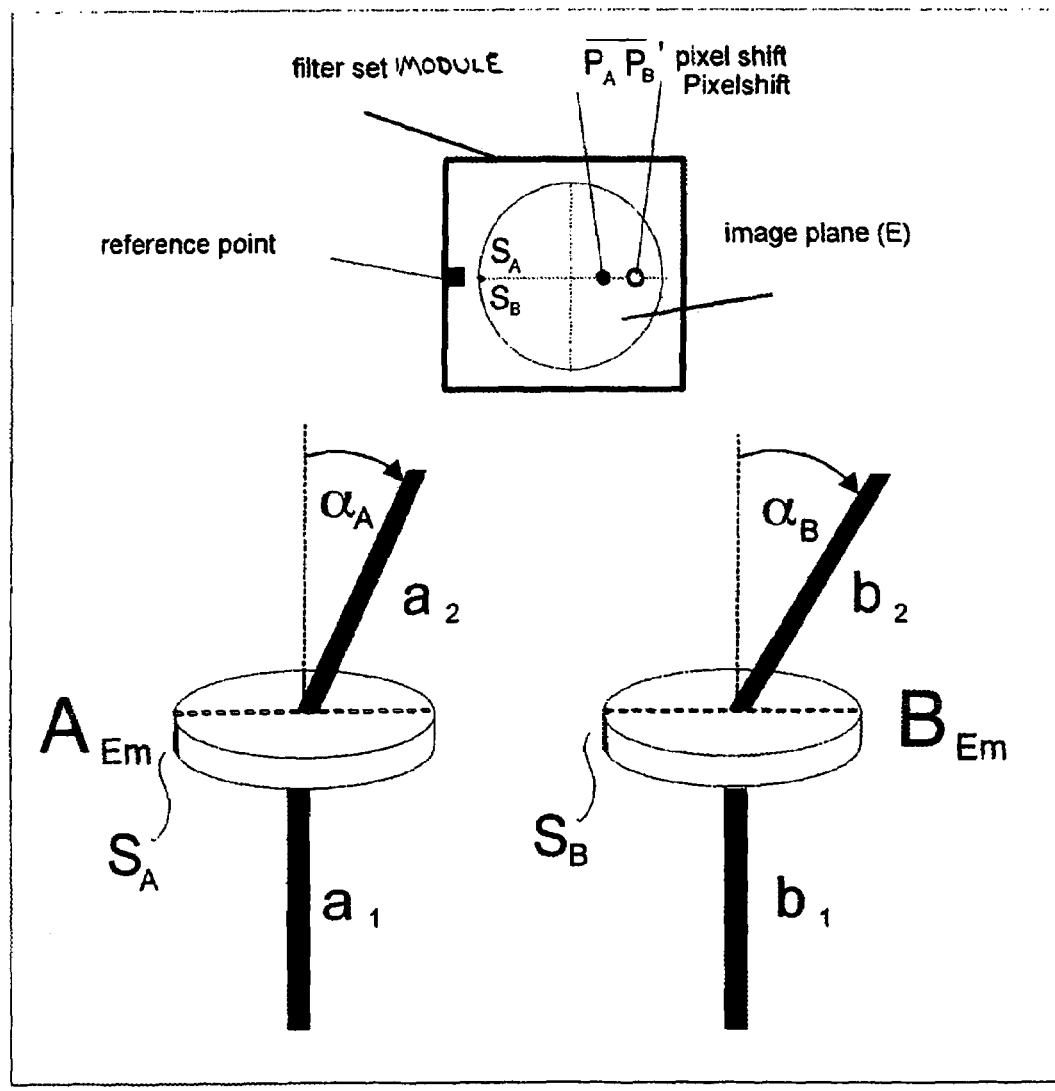
FIG. 3 is a diagrammatic view of how the filters are aligned with one another with respect to their wedge angle.

According to the invention, as is shown in FIG. 3, the filters are aligned with one another with respect to their wedge angle. The filters are measured and marked by the microscope manufacturer beforehand with respect to wedge angle and orientation, for example, in an autocollimator, e.g., by means of a line S on the side which can be arranged, e.g., on the side located opposite the deflecting direction through the wedge effect. When the filter is inserted into the respective filter module of the microscope, this filter module also has a marking which is made to coincide with the marking on the filter. Identical orientation of the filters is ensured in this way.

Figure 1:
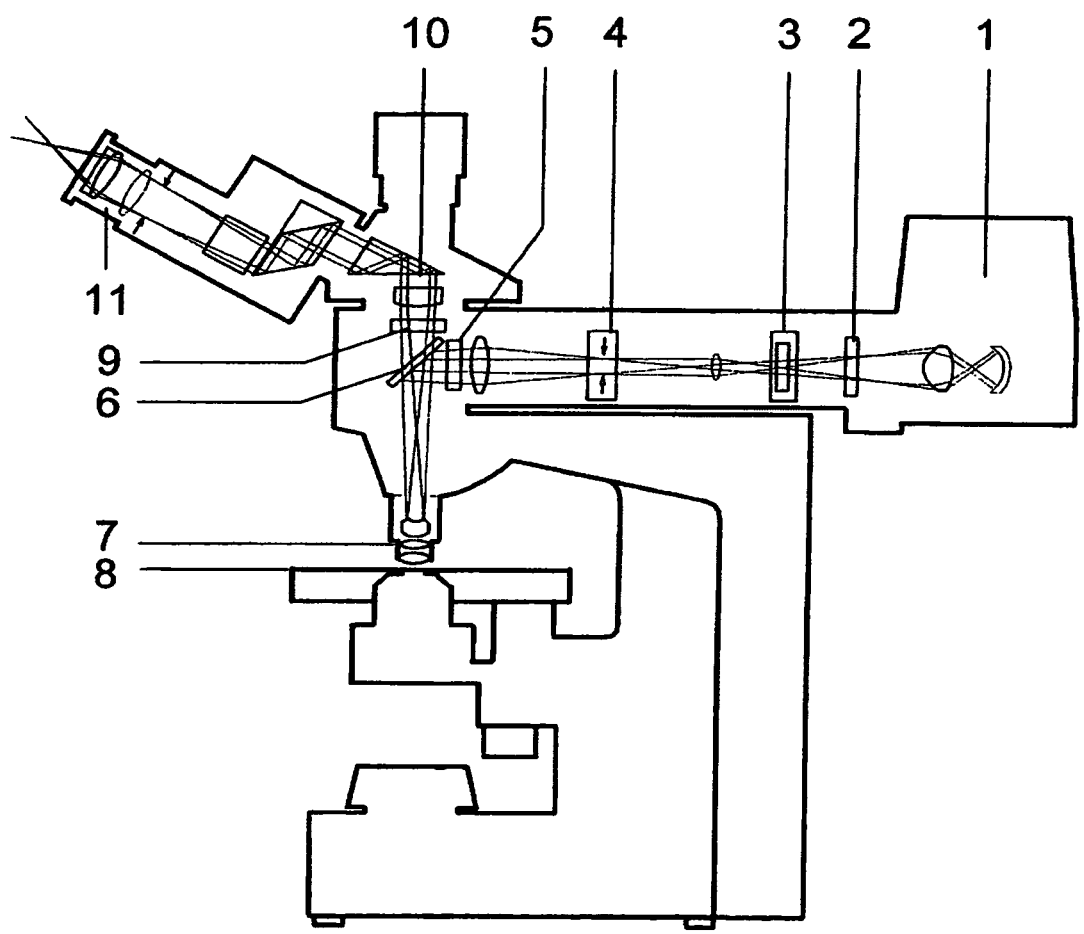
FIG. 1 is a schematic illustration of a fluorescence microscope.
Figure 2:
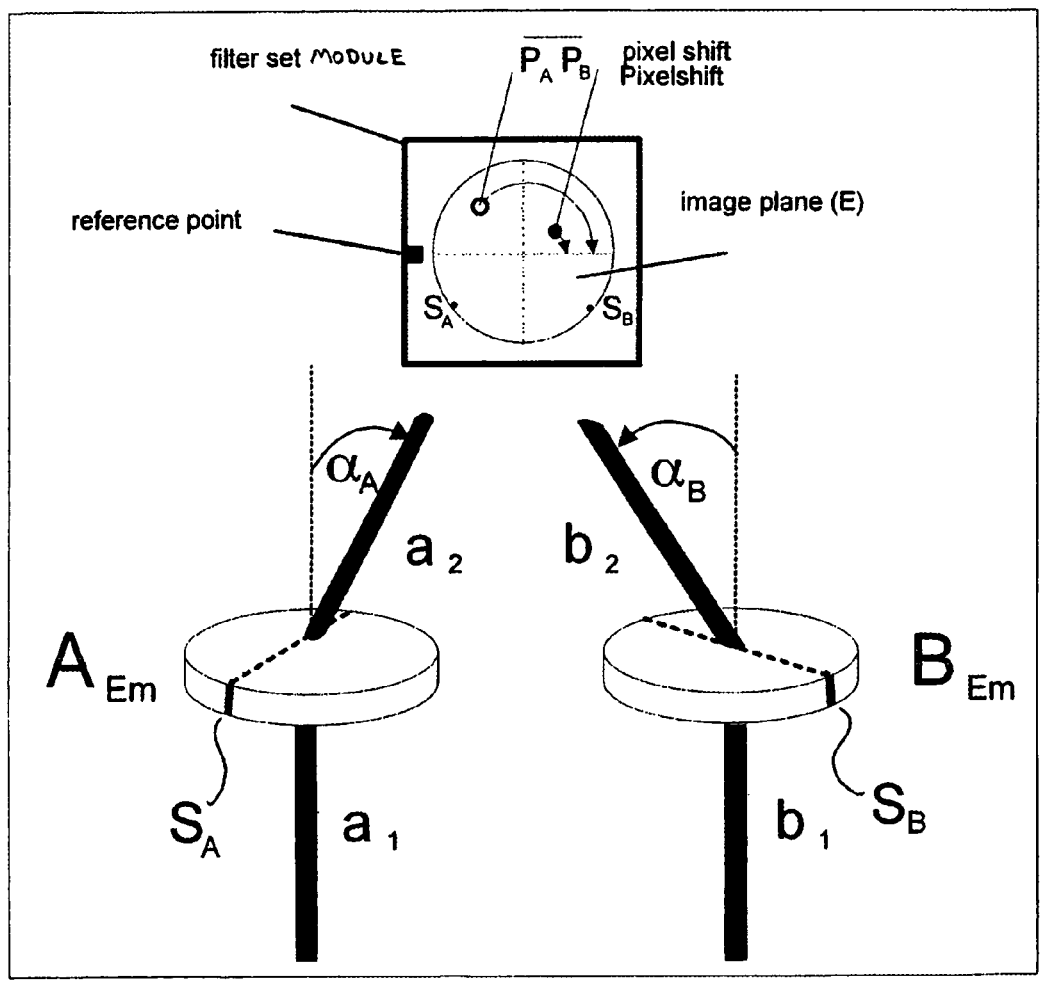
FIG. 2 is a diagrammatic view of how the different wedge angles of the emission filters and of the color splitters cause a slight image offset.

After the emission filters $A_{Em}$ and $B_{Em}$ are swiveled in (see FIG. 1), the impinging light beams $a_1$ and $b_1$ are deflected in the same direction ($a_2$ and $b_2$). In this way, the pixel shift which exists to a slight extent in any case is minimized or, ideally, compensated (pixel shift $\overline{P_A P_B}'$).

In this connection, the wedge angles can also be determined on the part of the manufacturer and filters with identical wedge angles can be marked and correlated by the user.

While the foregoing description and drawings represent the present invention, it will be obvious to those skilled in the art that various changes may be made therein without departing from the true spirit and scope of the present invention.

What is claimed is:

1. In a fluorescence microscope, an arrangement comprising:

blocking filters each having a determined wedge angle caused by tolerances of each one of the blocking filters, and being used for blocking a portion of the light emitted by a specimen;

wherein said blocking filters are marked with respect to the orientation of their wedge angles.

2. The arrangement according to claim 1, wherein said microscope has a filter module, and wherein a marking to which the marking on the filter can be oriented in a defined manner is provided on said first module.

* * * * *